United States Patent [19]

Kamiya et al.

[11] Patent Number: 5,195,169
[45] Date of Patent: Mar. 16, 1993

[54] CONTROL DEVICE FOR CONTROLLING LEARNING OF A NEURAL NETWORK

[75] Inventors: Shin Kamiya; Fumio Togawa, both of Nara, Japan

[73] Assignee: Sharp Kabushiki Kaisha, Osaka, Japan

[21] Appl. No.: 827,494

[22] Filed: Jan. 30, 1992

Related U.S. Application Data

[63] Continuation of Ser. No. 486,165, Feb. 28, 1990, abandoned.

[30] Foreign Application Priority Data

Mar. 3, 1989 [JP] Japan ................................. 1-52684

[51] Int. Cl.$^5$ ............................................. G06F 15/18
[52] U.S. Cl. ............................................................. 395/23
[58] Field of Search ...................................... 395/21, 23

[56] References Cited

U.S. PATENT DOCUMENTS

| | | | |
|---|---|---|---|
| 4,912,649 | 3/1990 | Wood | 364/513 |
| 4,979,126 | 12/1990 | Pao et al. | 364/513 |
| 5,033,006 | 7/1991 | Ishizuka et al. | 364/513 |

OTHER PUBLICATIONS

Mozer et al., "Skeletonization: A Technique for Trimming the Fat from a Network Via Relevance Assessment", Advances in Neural Information Processing Systems I, 1989, 107-115.
Sietsma et al., "Neural Net Pruning—Why and How" Proceedings IEEE Intl. Conf. Neural Networks vol. I, 1988, pp. I-325-I-333.
Moore et al., "Characterizing the Error Function of a Neural Network", IEEE Symposium on the Frontiers of Massively Parallel Computation, 1988, pp. 49-57.
McClelland et al., Explorations in Parallel Distributed Processing—A Handbook of Models, Programs, and Exercises, MIT Press, (1988), pp. 2, 3, 137-145.
Kung et al., "An Algebraic Projection Analysis of Optimal Hidden Units Size and Learning Rates in Back-Propagation Learning", IEEE Intl. Conf. on Neural Networks, IEEE, (1988), pp. I-363-I370.
Pao, Y., "Functional Link Nets—Removing Hidden Layers," AI Expert, Apr. '89, pp. 60-68.
karnin, E. D., "A Simple Procedure for Pruning Back-Propagation Trained Neural Networks", IEEE Trans. on Neural Networks, vol. 1, No. 2, Jun. 1990, pp. 239-242.

*Primary Examiner*—Michael R. Fleming
*Assistant Examiner*—Robert W. Downs

[57] ABSTRACT

A control device for controlling the learning of a neural netowrk includes a monitor for monitoring weight values of synapse connections between units of the neural netowrk during learning of the neural network so as to update these weight values. When one of the weight values satisfies a preset condition, the weight value is updated to a predetermined value such that configuration of the neural network is determined in an optimum manner.

6 Claims, 3 Drawing Sheets

CONTROL DEVICE FOR CONTROLLING LEARNING OF A NEURAL NETWORK

This application is a continuation of application Ser. No. 07/486,165 filed on Feb. 28, 1990, now abandoned.

BACKGROUND OF THE INVENTION

Field of the Invention

The present invention generally relates to a neural network, and more particularly, to a control device for controlling the learning in the neural network, which is capable of forcedly updating values of weights of synapse connections of the neural network from outside of the neural network during the learning of the neural network.

Recently, multilayered neural networks which learn by a learning method based on error back-propagation have been utilized in the fields of speech recognition and character recognition. Conventionally, not less than three-layer perceptron type neural networks have been generally used for such fields. As shown in FIG. 2, a three-layer perceptron type neural network is constituted by an input layer 1, an intermediate layer 2 and an output layer 3. The input layer 1 has a plurality of units 5. The intermediate layer 2 has a plurality of units 6, and the output layer 3 has a plurality of units 7. The network is formed by connecting each of the units 5 of the input layer 1 with all the units 6 of the intermediate layer 2 through synapse connections and connecting each of the units 6 of the intermediate layer with all the units 7 of the output layer 3 through synapse connections. When input data are inputted to the units 5 of the input layer 1, output data corresponding to configuration of this network are outputted from the units 7 of the output layer 3.

Each group of units (5 to 7) includes a receiver portion for receiving inputs from a preceding group of units, a conversion portion for converting the inputs into data based upon a predetermined rule and an output portion for outputting the converted data. Weights indicative of the strength of the synapse connections among the units (5 to 7) are imparted to the synapse connections. If the weights of the synapse connections are varied, configuration of the network is changed, and thus, the network yields different output values in response to identical input data.

Meanwhile, in this neural network, when data belonging to one of two events, having a predetermined interrelation, are applied to the units 5 of the input layer 1 and data (teacher's data) corresponding to the input data and belonging to the other event are applied to the units 7 of the output layer 3, the neural network performs a learning process based on error back propagation. Thus, the neural network resets the values of the weights of the synapse connections so as to reconfigure the network such that data identical with the above mentioned teacher's data are outputted from the units 7 of the output layer 3. In this neural network upon learning, when arbitrary data belonging to the above described one event are inputted to the units 5 of the input layer 1, data corresponding to the input data and belonging to the other event are outputted from the units 7 of the output layer 3.

In the three-layer perceptron type neural network referred to above, the number of the units 5 of the input layer 1 is determined by the degree of values of the input data, while the number of the units 7 of the output layer 3 is determined by the number of categories to be recognized. However, the number of the units 6 of the intermediate layer 2 varies according to the number of the units 7 of the output layer 3, accuracy of recognition, processing time, etc., and therefore, is determined by trial and error.

In the known three-layer perceptron type neural network, the number of the units 6 of the intermediate layer 2 is determined by trial and error as described above, and therefore, is usually set at a value larger than an expected necessary number in view of accuracy of recognition, etc. However, if the number of the units of the layers is increased, the number of connections between the units is also increased, thereby resulting in an undesirable increase in computing time for the neural network. Furthermore, if the number of the units is increased, units which are not associated with learning, in other words, units which are not associated with recognition are produced, thus resulting in deterioration of efficiency of learning and recognition.

SUMMARY OF THE PRESENT INVENTION

Accordingly, an essential object of the present invention is to provide a control device for controlling the learning of a neural network, which monitors values of weights of synapse connections between units of the neural network at the time of learning so as to not only set the number of the units at an optimum value but improve efficiency of learning by selectively updating the weights of the synapse connections as necessary.

In order to accomplish this object of the present invention, a control device for controlling the learning of a neural network, according to the present invention, comprises: a monitor which monitors weight values of synapse connections between units of the neural network during learning so as to update, in the case where one of the weight values satisfies a preset condition, the one of the weight values to a predetermined value such that reconfiguration of the neural network is determined in an optimum manner.

The above mentioned monitor of the control device of the present invention desirably comprises: an error computing portion which, at the time of learning, receives output data outputted from the neural network in response to data inputted to the neural network and teacher's data for the input data so as to compute errors between values of the output data and values of the teacher's data; an arithmetic portion which receives the weight values of the synapse connections between the units of the neural network during a learning process and performs, based on a predetermined algorithm, an arithmetic operation which detects which unit of a certain layer has a smaller average weight value than a predetermined value or which units of a certain layer have similar average weight values; a decision portion which makes, based on error values from the error computing portion and the arithmetic operation results from the arithmetic portion, a decision as to whether or not the average weight value smaller than the predetermined value or the similar average weight values should be updated by outputting a command signal when the decision is affirmative; and a weight updating portion for updating, based on the command signal outputted from the decision portion, the smaller average weight value or the similar average weight values.

When the learning of the neural network approaches convergence with respect to the weight updating portion updates this weight value to zero in accordance with the command signal from the decision portion.

Meanwhile, it is desirable that when the learning of the neural network approaches convergence with respect to the similar average weight values, the weight updating portion, in accordance with the command signal from the decision portion, maintains the weight values associated with one unit and updates the weight values associated with the other units to zero.

Furthermore, when the learning of the neural network does not converge with respect to the similar average weight values, the weight updating portion, in accordance with the command signal from the decision portion, maintains the weight values associated with one unit and updates the weight values associated with the other units to values based upon a predetermined rule.

The control device of the present invention operates as follows. The weight values of the synapse connections between the units of the neural network at the time of learning are inputted to the monitor and stored. Then, the monitor monitors the inputted weight values so as to update, when one of the weight values satisfies the preset condition, the weight value to the predetermined value. Therefore, reconfiguration of the neural network is determined in an optimum manner.

Meanwhile, in the control device of the present invention, when the values of the output data from the neural network, the values of the teacher's data, and the weight values of the synapse connections between the units have been inputted to the monitor during learning; the error values between the values of the output data and the teacher's data are computed by the error computing portion, while the arithmetic operation detects an unit having an average weight value smaller than a predetermined value and units having similar average weight values. Thus, based on the above error values and the arithmetic results, the decision portion makes a decision as to whether or not the smaller average weight value or the similar weight values should be updated. If the decision is affirmative, the decision portion outputs a command signal. In response to the command signal, the weight updating portion updates the smaller weight value or the similar weight values. Accordingly, reconfiguration of the neural network is determined in an optimum manner.

Furthermore, in the control device of the present invention, when an unit has an average weight value smaller than the predetermined value and the learning approaches convergence, the weight updating portion updates the weight values of this unit to zero in accordance with the command signal from the decision portion. Thus, since the unit having the smaller average weight value is eliminated, reconfiguration of the neural network is reduced to a minimum necessary scale.

Moreover, in the control device of the present invention, when a plurality of units have similar average weight values and learning of the neural network approaches convergence, the weight updating portion, in accordance with the command signal from the decision portion, maintains the weight values of one unit and updates the weight values of the other units to zero. Therefore, by eliminating units having the similar average weight values, the neural network is reduced to a minimum necessary scale.

In addition, in the control device of the present invention, similar average weight values and learning of the neural network does not converge, the weight updating portion, in accordance with the command signal from the decision portion, maintains the weight values of one unit and updates the weight values of the other units to values based upon a predetermined rule. Thus, by setting the similar weight values of the other units to different values, respectively, convergence of learning of the neural network is hastened such that learning of the neural network can be performed efficiently.

BRIEF DESCRIPTION OF THE DRAWINGS

This object and features of the present invention will become apparent from the following description taken in connection with the preferred embodiment thereof with reference to the accompanying drawings, in which.

DETAILED DESCRIPTION OF THE PRESENT INVENTION

Figure 1:
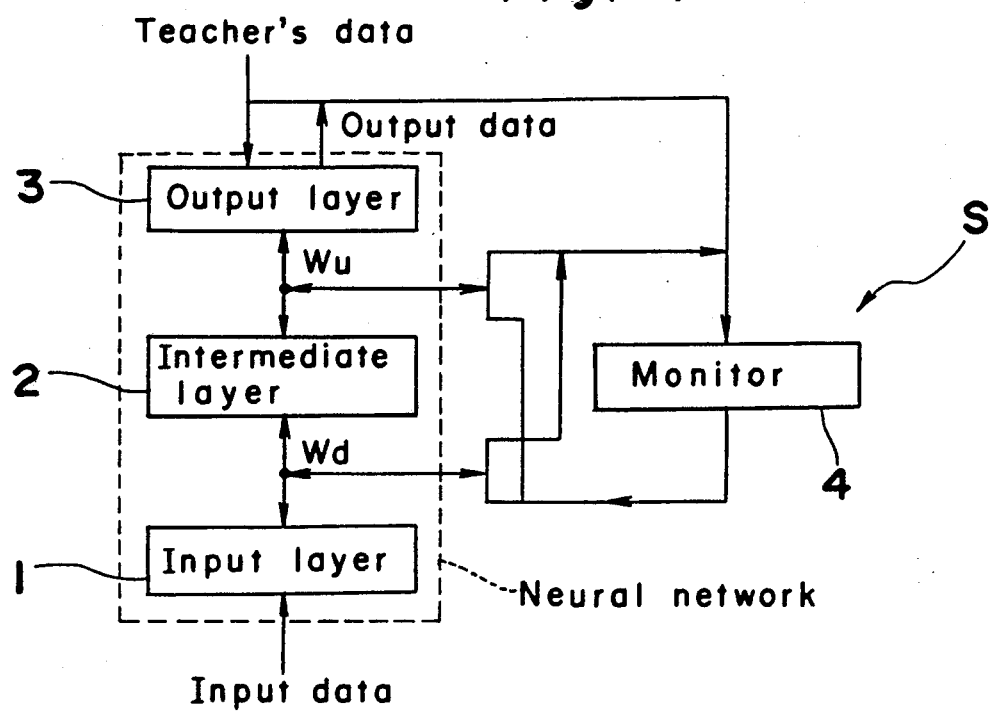
FIG. 1 is a block diagram showing a state in which by using a control device for controlling learning of a neural network, according to one embodiment of the present invention, learning is performed by the neural network.

Before the description of the present invention proceeds, it is to be noted that like parts are designated by like reference numerals throughout the accompanying drawings.

Referring now to the drawings, FIG. 1 schematically shows a state in which by using a control device S for controlling the learning of a neural network, according to one embodiment of the present invention, learning is performed by the neural network. The neural network employed in this embodiment is a three-layer perceptron type neural network constituted by an input layer 1, an intermediate layer 2 and an output layer 3 as shown in FIG. 2.

Figure 2:
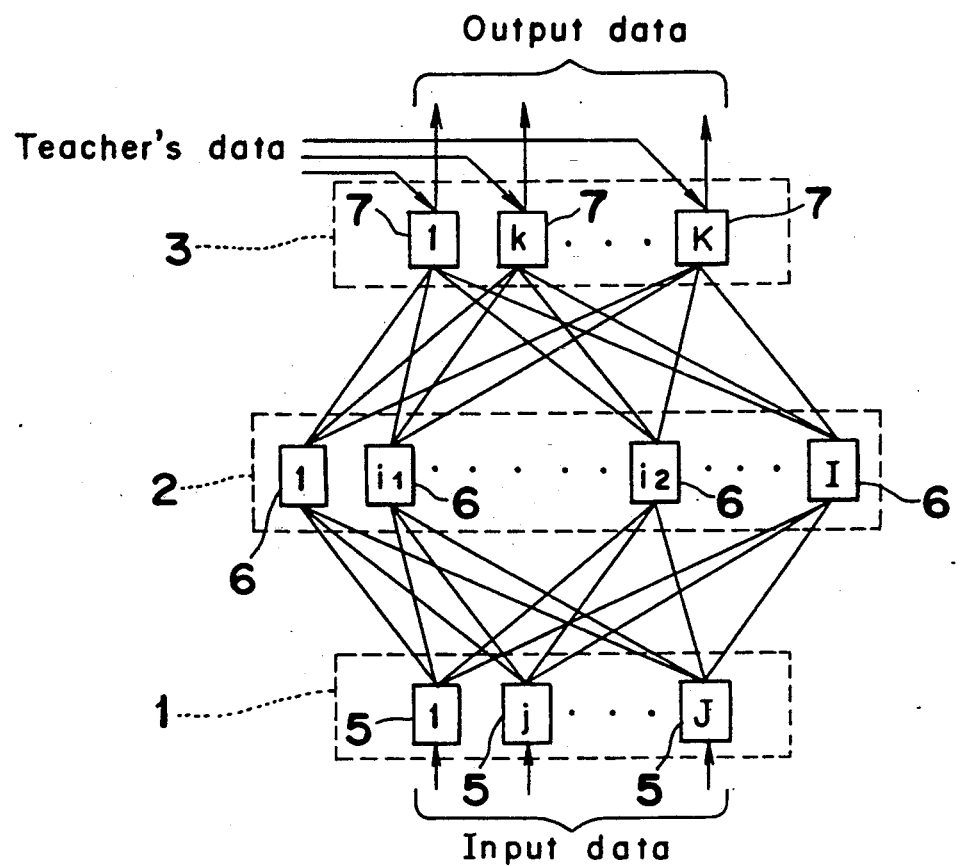
FIG. 2 is a view explanatory of configuration of the neural network of FIG. 1.

As shown in FIG. 2, the input layer 1 of the threelayer perceptron type neural network is constituted by a plurality of units 5, and the intermediate layer 2 is constituted by a plurality of units 7. Each of the units 5 os the input layer 1 is connected to all the units 6 of the intermediate layer 2 through synapse connections, while each of the units 6 is connected to all the units 7 of the output layer 3 through synapse connections. However, the units 5 of the input layer 1 are connected with each other, and the units 6 of the intermediate layer 2 are connected with each other. Likewise, the units 7 of the output layer 3 are not connected with each other. The number of the units 5 of the input layer 1 is determined by the degree of the input data, while the number of the units 7 of the output layer 3 is determined by the number of categories to be recognized. Meanwhile, the number of the units 5 of the intermediate layer 2 is set at a value slightly larger than an expected necessary number.

Weights Wd indicative of the strength of the connection are allotted to the synapse connections between each of the units 6 of the intermediate layer 2 with all the units 5 of the input layer while weights Wu indicative of the strength of the connection are allotted to the synapse connections between each of the units 7 of the output layer 3 with all the units 6 of the intermediate layer 2. Weight values Wd and Wu, output data from each of the units 7 of the output layer 3, and teacher's data are inputted to a monitor 4 of the control device S such that the weight values Wd and Wu are monitored during the learning process of the neural network. Then, as will be described in detail later, the weight values Wd and Wu are updated as necessary such that efficiency of learning is improved. Furthermore, by setting the number of the units 6 of the intermediate layer 2 at an optimum value, an optimum reconfiguration of the neural network is determined.

Figure 3:
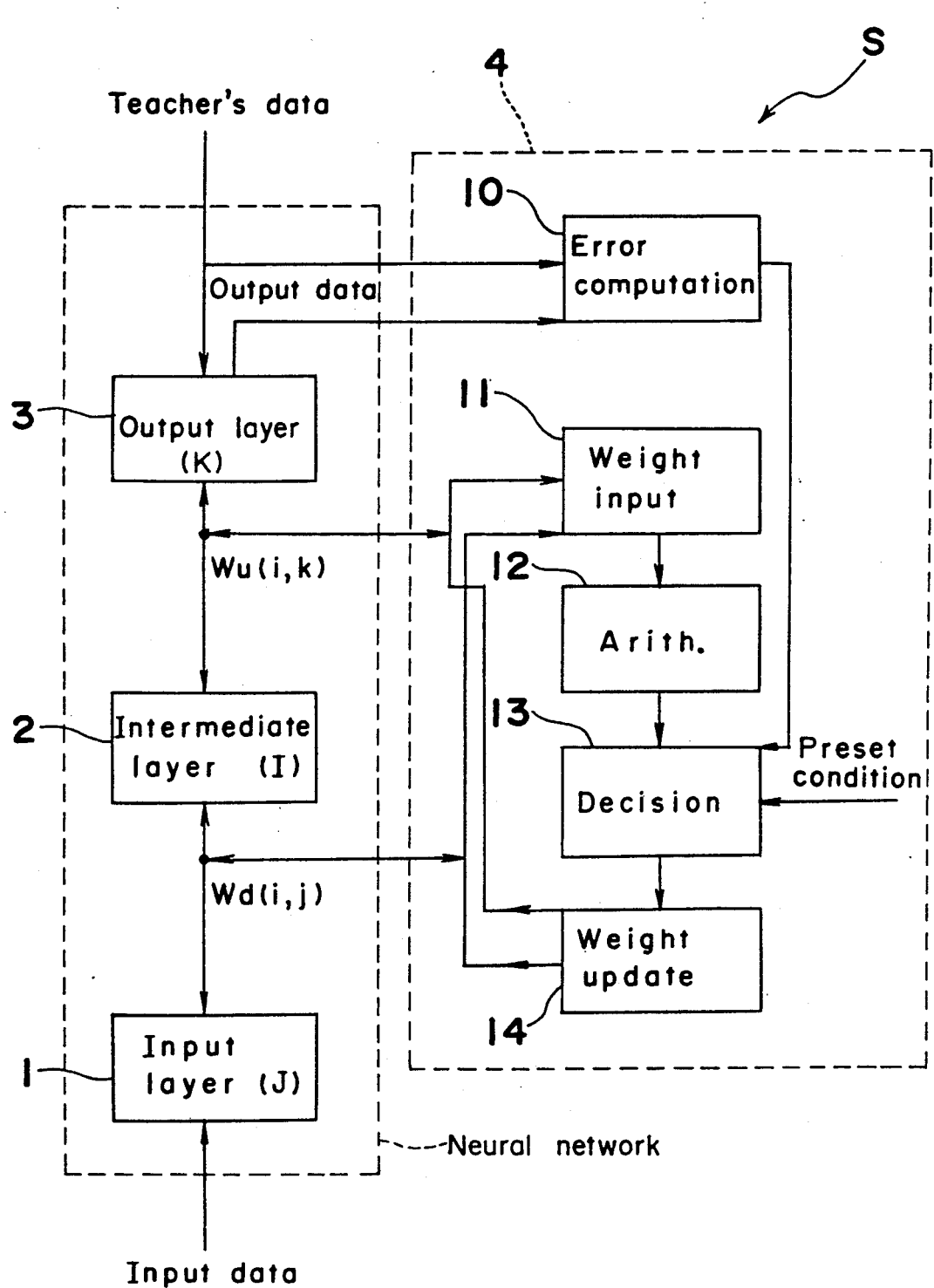
FIG. 3 is a diagram showing a monitor employed in the control device of FIG. 1.
Figure 4:
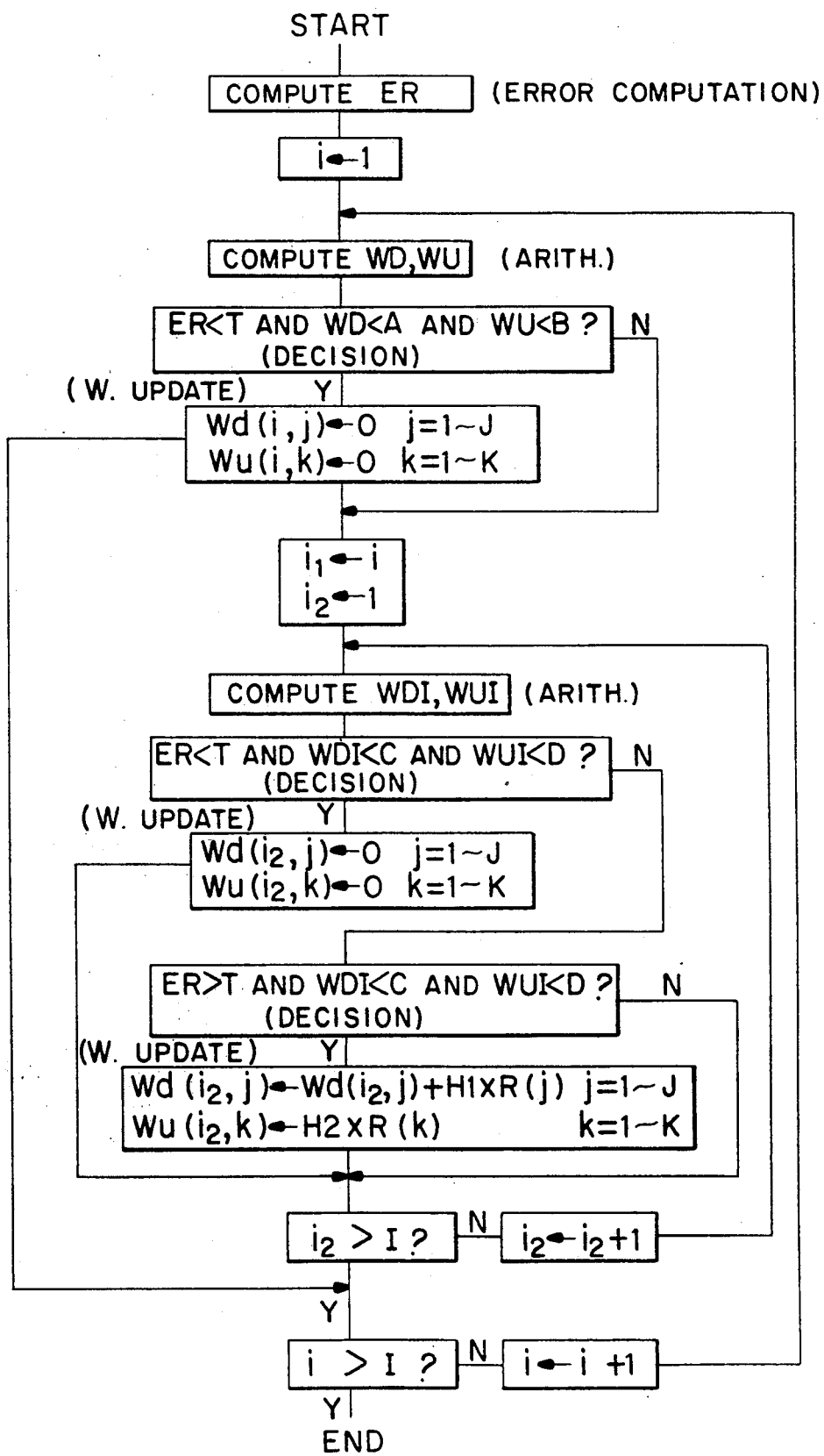
FIG. 4 is a flowchart of the process for updating the weight values of the neural network according to the present invention.

FIG. 3 shows the monitor 4 of the control device S of the present invention in detail. The monitor 4 is constituted by an error computing portion 10, a weight input portion 11, an arithmetic portion 12, a decision portion 13 and a weight updating portion 14. In FIG. 3, the three-layer perceptron type neural network is schematically illustrated as in FIG. 1. Supposing that characters I, J and K denote natural numbers, the number of the units 5 of the input layer 1 is J; the number of the units 6 of the intermediate layer is I; and the number of the units 7 of the output layer 3 is K.

The error computing portion 10 receives output data issued from all the units 7 of the output layer 3 and the teacher's data applied to all the units 7 of the output layer 3 and computes error between the output data and the teacher's data so as to input the error to the decision portion 13 as will be described in detail below.

The weight input portion 11 receives weight values $Wd(i,j)$ allotted to all the units 6 of the intermediate layer 2 and weight values $Wu(i,k)$ allotted to all the units 7 of the output layer 3 and outputs the values $Wd(i,j)$ and $Wu(i,k)$ to the arithmetic portion 12. The weight values $Wd(i,j)$ represent a weight value of a synapse connection between the i-th unit 6 ($1 \leq i \leq I$) of the intermediate layer 2 and the j-th unit 5 ($1 \leq j \leq J$) of the input layer 1. Likewise, the weight values $Wu(i,k)$ represent a weight value of a synapse connection between the i-th unit 6 of the intermediate layer 2 and the k-th unit 7 ($1 \leq k \leq K$) of the output layer 7. Thus, the arithmetic portion 12 performs various arithmetic operations on the basis of the weight values $Wd(i,j)$ and the weight values $Wu(i,k)$ so as to search the intermediate layer 2 for the units 6 having similar weight values or the units 6 having small weight values.

As will be described in detail below, based on the arithmetic results of the arithmetic portion 12 and preset conditions inputted to the decision portion 13, the decision portion 13 decides whether or not it is necessary to update the weight value (i,j) or the weight value $Wu(i,k)$. If this decision is affirmative, the decision portion 13 outputs a command signal for updating the weight value $Wd(i,j)$ or the weight value $Wu(i,k)$.

In response to the command signal from the decision portion 13, the weight updating portion 14 updates the weight value $Wd(i,j)$ into a weight value $Wd'(i,j)$ or the weight value $Wu(i,k)$ into a weight value $Wu'(i,k)$ and outputs the updated weight value $Wd'(i,j)$ or $Wu'(i,k)$.

Below, the learning of the neural network by the use of the monitor 4 is described in detail. Learning is performed in the above mentioned three-layer perceptron type neural network as follows. Initially, if values of correct output data (i.e. teacher's data) corresponding to input data are known, the input values are inputted to each of the units 5 of the input layer 1. Thus, the input data are converted by each of the units 5 by using a predetermined conversion equation (generally, a threshold function or Sigmoid function) and then inputted to all the units 6 of the intermediate layer 2. At this time, the products of the output values of the input layer 1 with the weights Wd are inputted to each of the units 6 of the intermediate layer 2. Likewise, the data from each of the units 5 of the input layer 1 are converged by each of the units 6 of the intermediate layer 2 by using the above mentioned conversion equation and are transmitted to all the units 7 of the output layer 3. At this time, the products of the output values of the intermediate layer 2 and the weights Wu are inputted to each of the units 7 of the output layer 3. Furthermore, the data from each of the units 6 of the intermediate layer 2 is converted into final output data by each of the units 7 of the output layer 3 such that the final output data is outputted by each of the units 7 of the output layer 3.

Subsequently, the teacher's data corresponding to the input data are inputted to each of the units 7 of the output layer 3. Thus, through learning based on error back-propagation, the neural network sets the weights Wd and Wu such that data outputted from each of the units 7 of the output layer 3 becomes identical to the above mentioned teacher's data when the above mentioned input data has been inputted to each of the units 5 of the input layer 1.

At this time, for example, output data Ok from each of the units 7 of the output layer 3 and teacher's data Tk are applied to the error computing portion 10 of the monitor 4 as described above. The output data Ok represents output data from the k-th unit 7 of the output layer 3. Then, from the output data Ok and the teacher's data Tk which are inputted to the error computing portion 10, a value ER is computed by the following equation.

$$ER = (1/k) \sum_{k=1}^{K} |Tk - Ok|$$

Then, the error computing portion 10 outputs the value ER to the decision portion 13.

Meanwhile, the weight input portion 11 receives the weight values $wd(i,j)$ and $wu(i,k)$ in the course of learning and outputs the values $Wd(i,j)$ and $Wu(i,k)$ to the arithmetic portion 12. Thereafter, from the weight values $Wd(i,j)$ and $Wu(i,k)$, the arithmetic portion 12 calculates the values WD, WU, WDI and WUI from the following equations.

$$WD = (1/J) \sum_{j=1}^{J} |Wd(i,j)|$$

$$WU = (1/k) \sum_{k=1}^{K} |Wu(i,k)|$$

$$WDI = (1/J) \sum_{j=1}^{J} |Wd(i_1,j) - Wd(i_2,j)|$$

$$WUI = (1/K) \sum_{k=1}^{K} |Wu(i_1,k) - Wu(i_2,k)|$$

The arithmetic portion 12 outputs the values WD WU,, WDI and WUI to the decision portion 13. Then, on the basis of the values ER, WD, WU, WDI AND WUI inputted to the decision portion 13, the decision portion 13 makes such a decision as described later. Subsequently, based on this decision, the weight updating portion 14 updates the weight values Wd and Wu.

The decision of the decision portion 13 and updating of the weight updating portion 14 are described in detail with reference to the following cases (1) to (3).

(1) If ER<T, WD<A and WU<B:

When learning proceeds as described above, the output data outputted from each of the units 7 of the output layer 3 becomes approximate equal to the teacher's data. Thus, when an average value of errors between the values of the output data and the values of the teacher's data; i.e., the value ER becomes smaller than a threshold value T, it is decided that learning of the neural network has approximately converged.

At this time, when an average weight value of synapse connections on an input side an unit in the intermediate layer 2; i.e., the value WD; is smaller than a threshold value A, and when an average weight value of synapse connections on an output side of an unit in the intermediate layer 2; i.e., the value WU, is smaller than a threshold value B, the units in the intermediate layer associated with these weights do not affect learning. Therefore, if such conditions as described above exist, the synapse connections between each of units 6 and all the units 5 of the input layer 1, and the synapse connections between each such units 6 with all the units 7 of the output layer 3 are cut, namely, the weight values Wd and Wu are set to 0, whereby efficiency of learning can be raised and the number of the units 6 in the intermediate layer 2 can be set at a proper value.

Thus, the decision portion 13 outputs to the weight updating portion 14 a command signal for setting the weight values of the connections between the i-th unit 6 of the intermediate layer 2 and all the units 5 of the input layer 1 to 0 and for setting the weight values of the connections between the i-th unit 6 of the intermediate layer 2 with all the units 7 of the output layer 3 to 0. Meanwhile, optimum values of the above described threshold values T, A and B are preliminarily stored in a storage portion (not shown).

Then, the weight updating portion 14 outputs the weight values Wd(i,j)=0 (j=1−J) and the weight values Wu(i,k)−0 (k=1−k) to update the values Wd and Wu.

Thus, the units not affecting learning are eliminated, so that the number of the units of the intermediate layer 2, which has been initially set at a large value, is set to an optimum value, and thus, computing time of the neural network as a whole can be reduced significantly.

(2) If ER<T, WDI<C and WUI<D:

When learning of the neural network approximately converges, the average value of the errors between the output data and the teacher's data; i.e., the value ER; becomes smaller than the threshold value T. At this time, when an average value of the differences between the weight values of connections between an $i_1$-th unit 6 of the intermediate layer 2 with all the units 5 of the input layer 1 and the weight values of connections between an $i_2$-th unit 6 of the intermediate layer 2 with all the units 5 of the input layer 1; i.e., the value WDI; is smaller than a threshold value C, and an average value of the differences between the weight values of connections between an $i_1$-th unit 6 of the intermediate layer 2 with all the units 7 of the output layer 3 and the weight values of connections between an $i_2$-th unit 6 of the intermediate layer 2 with all the units 7 of the output layer 3; i.e., the value WUI; is smaller than a threshold value D; the weight values Wd and Wu of the $i_1$-th unit 6 should be quite similar to the weight values Wd and Wu of the $i_2$-th unit 6. Therefore, only one of the $i_1$-th unit 6 and the $i_2$-th unit 6 needs to be used thereby eliminating the other one. Accordingly, if two such units as the $i_1$- th unit 6 and $i_2$-th unit 6 exist in the intermediate layer 2, the synapse connections between one of the two units and all the units 5 of the input layer 1 and all the units 7 of the output layer 3 are cut, whereby efficiency of learning can be improved and the number of the units 6 of the intermediate layer 2 can be set at a proper value.

Thus, the decision portion 13 outputs to the weight updating portion 14, a command signal for setting the weight values Wd of the connections between the $i_2$-th or $i_1$-th unit of the intermediate layer 2 with al the units 5 of the input layer 1 to 0 and for setting the weight values Wu of the $i_2$-th or $i_1$-th unit 6 of the intermediate layer 2 with all the units 7 of the output layer 3 to 0. Meanwhile, optimum values of the above described threshold values C and D are preliminarily stored in the above described storage portion.

Then, the weight updating portion 14 outputs, for example, the weight values Wd($i_2$,j)=0 (j=1−J) and the weight values Wu($i_2$, k)=0 (k=1−k) to update the weight values Wd and Wu.

Thus, since unnecessary units are further eliminated in the intermediate layer 2, computing time of the neural network as a whole can be reduced.

(3) If ER>T, WDI<C and WUI<D after a predetermined amount of computing time:

In this case, the average value of the errors between the values of the output data and the teacher's data outputted from each of the units 7 of the output layer 3; i.e., the value Er; does not become smaller than the threshold value T even after a predetermined lapse of the computing time, and thus, it is decided that learning of the neural network is not converging. Namely, this is when a locally optimum value of an energy function is assumed. In this case, such a procedure as described above in case (2) cannot be taken such that the synapse connections of one of the $i_1$-th and $i_2$-th units 6 having the quite similar values of the weights Wd and Wu are not cut.

Accordingly, if two such units 6 exist in the intermediate layer 2, the decision portion 13 outputs to the weight updating portion 14, a command signal for forcedly updating the weight values Wd and Wu of one of the $i_1$-th and $i_2$-th units 6 to values based upon a predetermined rule.

Thus, the weight updating portion 14 updates, for example, the weight values Wd and Wu of the $i_2$-th unit 6 as follows:

$$Wd(i_2,j) \leftarrow Wd(i_2, j) + H1 \times R(j)$$

$$Wu(i_2,k) \leftarrow H2 \times R(k)$$

where
 i=1−J,
 k=1−K,
 H1 and H2 are constants, and
 R(j) and R(k) are random functions.

Meanwhile, the constants H1 and H2 and values of the random functions R(j) and R(k) are preliminarily stored in the above described storage portion.

Thus, learning of the neural network is forced into convergence so as to be performed efficiently. In the course of learning, the weight updating portion 14 computes, in a step width determined by constants; i.e., a learning constant and a stabilization constant, the weight values Wd and Wu of units other than the above problematical units on the basis of the weight values Wd and Wu obtained during the previous learning process. When it is desirable that the weight values Wd and Wu of units other than the problematical units should not change greatly, the above constants may be set at small values. Thus, only the weight values Wd and Wu of the $i_2$-th unit 6 of the intermediate layer 2 change greatly.

As described above, in the present invention, when the decision portion 13 has decided, based on the average value of the errors between the values of the output data and the values of the teacher's data, which is computed by the error computing portion 10, the average value of $|Wd(i,j)|$ of the i-th unit 6 of the intermediate layer 2 with respect to al the units 7 of the output layer 3, which is computed by the arithmetic portion 12, and the average value of the $|Wu(i,k)|$ of connection of the i-th unit 6 of the intermediate layer 2 with all the units 7 of the output layer 3, that some units 6 do not affect learning when learning of the neural network approaches convergence; the weigh values Wd and Wu of these units 6 are forcedly updated to 0 by the weight updating portion 14 such that the synapse connections of these units 6 not affecting learning are cut.

Therefore, in accordance with the present invention, by disconnecting the unnecessary units 6 in the intermediate layer 2, efficiency of learning of the neural network is improved and the number of the units 6 of the intermediate layer 2, which has been initially set to a rather large value, can be set to an optimum value.

Meanwhile, when the decision portion 13 has decided, based on the average value of the errors between the output data and the values of the teacher's data, which is computed by the error computing portion 10 and the average value of $|Wd(i_1, j) - Wd(i_2, j)|$ of the $i_1$-th unit 6 and $i_2$-th unit 6 of the intermediate layer 2 with respect to all the units 5 of the input layer i, that a plurality of units 6 have quite similar weight values Wd and Wd, respectively, when learning of the neural network approaches convergence; the weight updating portion 14 maintains the weight values Wd and Wu of one of the similar units 6 and forcedly updates the weight values Wd and Wu of the other similar units 6 to 0 so as to cut the synapse connections of the other units 6. Therefore, in accordance with the present invention, by disconnecting the unnecessary units 6 in the intermediate layer 2, efficiency of learning of the neural network is raised and the number of the units 6 of the intermediate layer 2 can be set at an optimum value.

Meanwhile, when the decision portion 13 has decided that a plurality of units having quite similar weight values Wd and Wu exist in the intermediate layer 2 when learning of the neural network is not likely to converge, the weight updating portion 14 maintains the weight values Wd and Wu of one of the similar units 6 and forcedly updates the weight values Wd and Wu of the other similar units 6 to o the values. Thus, in accordance with the present invention, since the learning which is least likely to converge is guided into convergence, learning of the neural network can be performed efficiently.

In other words, in the present invention, the weight values Wd and Wu of the synapse connections of the units of the neural network are monitored by the monitor 4 during learning and the weight values Wd and Wu satisfying the present conditions are updated to the predetermined values. Therefore, in accordance with the present invention, reconfiguration of the neural network can be determined in an optimum manner.

In learning of the present invention, algorithms used for decision of convergence, detection of the units not affecting learning, detection of the units having similar weight values Wd and Wu, etc. are not restricted to those of the above embodiment. Namely, it is possible to employ any algorithm which decides convergence of learning, detects the units approximate to zero in the intermediate layer 2 and detects the units having quite similar weight values Wd and Wu in the intermediate layer 2.

In the above described embodiment, the three-layer perceptron type neural network has been described. However, the present invention is not limited to the three-layer perceptron type neural network but can be applied to perceptron type neural networks having four or more layers.

Furthermore, in the above embodiment, learning of the multilayered perceptron type neural network has been described. However, the present invention may also be applied to learning of other neural networks.

As is clear from the foregoing, in the control device for controlling learning of the neural network, according to the present invention, the weight values of the synapse connections of the units are monitored by the monitor such that the weight values satisfying the preset conditions are updated to the predetermined values. Thus, in accordance with the present invention, reconfiguration of the neural network can be determined in an optimum manner.

Meanwhile, the monitor of the control device of the present invention includes the error computing portion, the arithmetic portion, the decision portion and the weight updating portion. During learning, the errors between the output data and the teacher's data are computed by the error computing portion and arithmetic operation detects, during learning, units having smaller weight values than the predetermined values or the units having the similar weight values is performed by the arithmetic portion. Thus, when the decision portion has decided, based on the above errors and arithmetic results, that the weight values should be updated, the weight values of the units having the smaller weight values than the predetermined values or those of the units having the similar weight values are forcedly updated by the weight updating portion. Accordingly, in accordance with the present invention, learning of the neural network can be performed efficiently and configuration of the neural network can be determined in an optimum manner.

Meanwhile, in the control device of the present invention, when there exist units having small weight values when learning of the neural network approaches convergence, the weight updating portion updates the weight values of these units to 0 in accordance with the command signal from the decision portion. Therefore, in accordance with the present invention, by disconnecting the unnecessary units, efficiency of learning of the neural network can be improved and configuration of the neural network can be determined in an optimum manner.

Furthermore, in the control device of the present invention, when there exist a plurality of the units having similar weight values when learning of the neural network approaches convergence, the weight updating portion maintains the weight value of one of the similar units and updates the weight values of the other similar units in accordance with the command signal from the decision portion. Thus, in accordance with the present invention, by disconnecting the unnecessary units, efficiency of learning of the neural network can be improved and configuration of the neural network can be determined in an optimum manner.

Moreover, in the control device of the present invention, when a plurality of the units having similar weight values exist when learning of the neural network is not likely to converge, the weight updating portion, in accordance with the command signal from the decision portion, maintains the weight values of one of the similar units and updates the weight values of the other similar units to values based upon the predetermined rule. Accordingly, in accordance with the present invention, learning of the neural network least likely to converge can be guided into convergence and efficiency of learning of the neural network can be improved.

Although the present invention has been fully described by was of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A system for supporting a learning process, comprising:
   a neural network having a plurality of layers, each layer having a plurality of units, units of one layer being connected to units of another layer by synapse connections, each synapse connection having a weight value associated therewith; and
   a control device, connected to said neural network, for controlling a learning function of said neural network;
   said control device including,
   weight input means for receiving said weight values of said synapse connections;
   arithmetic means, operatively connected to said weight input means, for calculating an average value for each unit of a layer, said average value being an average of said weight values of synapse connections associated with one side of said unit,
   decision means, operatively connected to said arithmetic means, for determining if an average value of an unit calculated by said arithmetic means is smaller than a first threshold value, for determining if a difference between target data and output data from said neural network is smaller than a second threshold value, and for outputting a signal when both determinations are affirmative, and
   weight update means, in response to said signal, for setting the weight values associated with the unit having an average weight value less than said first threshold value to zero.

2. The system as claimed in claim 1, wherein said control device further includes:
   error computing means for receiving said output data from said neural network and said target data and for computing said difference between said output data and said target data.

3. A system for supporting a learning process, comprising:
   a neural network having a plurality of layers, each layer having a plurality of units, units of one layer being connected to units of another layer by synapse connections, each synapse connection having a weight value associated therewith; and
   a control device, connected tos aid neural network, for controlling a learning function of said neural network;
   said control device including,
   weight input means for receiving said weight values of said synapse connections,
   arithmetic means, operatively connected to said weight input means, for calculating an average value for each unit of a layer, said average value being an average of said weight values of synapse connections associated with one side of said unit,
   decision means, operatively connected to said arithmetic means, for determining if a first difference between an average value of one unit calculated by said arithmetic means and an average value of another unit is smaller then a first threshold value, for determining if a second difference between a target data and an output data from said neural network is smaller then a second threshold value, and for outputting a first signal when both determinations are affirmative, and
   weight update means, in response to said first signal, for maintaining the weight values of said one unit and for setting the weight values of said another unit to zero.

4. The system as claimed in claim 3 wherein said decision means outputs a second signal when said first difference is smaller than said first threshold value and said second difference is greater than said second threshold value; and
   said weight updating means setting the weight values of said one unit and said another unit to values based on a predetermined rule.

5. The system as claimed in claim 4, wherein said control device further includes:
   error computing means for receiving said output data from said neural network and said target data for computing said second difference between said output data and said target data.

6. The system as claimed in claim 3, wherein said control device further includes:
   error computing means for receiving said output data from said neural network and said target data and for computing said second difference between said output data and said target data.

* * * * *